US009240155B2

(12) United States Patent
Yu

(10) Patent No.: US 9,240,155 B2
(45) Date of Patent: Jan. 19, 2016

(54) DRIVING CIRCUIT AND DRIVING METHOD THEREOF AND LIQUID CRYSTAL DISPLAY

(75) Inventor: Yao Yu, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 136 days.

(21) Appl. No.: 13/377,955

(22) PCT Filed: Apr. 6, 2011

(86) PCT No.: PCT/CN2011/072466
§ 371 (c)(1),
(2), (4) Date: Dec. 13, 2011

(87) PCT Pub. No.: WO2011/131086
PCT Pub. Date: Oct. 27, 2011

(65) Prior Publication Data

US 2012/0081342 A1 Apr. 5, 2012

(30) Foreign Application Priority Data

Apr. 23, 2010 (CN) .......................... 2010 1 0158923

(51) Int. Cl.
*G09G 3/36* (2006.01)
*G06F 3/038* (2013.01)
*G09G 5/00* (2006.01)

(52) U.S. Cl.
CPC ........ *G09G 3/3677* (2013.01); *G09G 2310/063* (2013.01); *G09G 2360/145* (2013.01)

(58) Field of Classification Search
CPC ...... G08B 27/00; G08B 27/003; G08B 21/14; G09G 3/3406; G09G 5/00; G09G 2320/0238; G09G 2320/0285
See application file for complete search history.

(56) References Cited

U.S. PATENT DOCUMENTS

| | | | | |
|---|---|---|---|---|
| 2001/0009411 | A1* | 7/2001 | Kusanagi | 345/93 |
| 2006/0022935 | A1* | 2/2006 | Sakai et al. | 345/102 |
| 2007/0152952 | A1* | 7/2007 | Kang et al. | 345/102 |
| 2008/0084377 | A1* | 4/2008 | Tateuchi et al. | 345/92 |
| 2008/0245948 | A1* | 10/2008 | Tsai | 250/200 |

(Continued)

FOREIGN PATENT DOCUMENTS

| | | | |
|---|---|---|---|
| CM | 1201967 | A | 12/1998 |
| CN | 1183604 | A | 6/1998 |

(Continued)

OTHER PUBLICATIONS

International Preliminary Report on Patentability; Appln. No. PCT/CN2011/072466; issued Oct. 23, 2012.

(Continued)

*Primary Examiner* — Alexander Eisen
*Assistant Examiner* — Nan-Ying Yang
(74) *Attorney, Agent, or Firm* — Ladas & Parry LLP

(57) ABSTRACT

A driving circuit for a liquid crystal display comprises a light sensitive element configured to be arranged on a liquid crystal panel of the liquid crystal display, and detect an operation state of a backlight source of the liquid crystal display; and a reset signal output device configured to receive an input signal from the light sensitive element in accordance with the operation state of the backlight source, and output a reset signal to a gate line driver of the liquid crystal display so as to turn on all of gate lines on the liquid crystal panel.

13 Claims, 2 Drawing Sheets

(56) References Cited

U.S. PATENT DOCUMENTS

| | | | | |
|---|---|---|---|---|
| 2008/0316157 | A1 | 12/2008 | Park et al. | |
| 2009/0206664 | A1* | 8/2009 | Sasaki et al. | 307/33 |

FOREIGN PATENT DOCUMENTS

| | | | |
|---|---|---|---|
| CN | 1588528 | A | 3/2005 |
| CN | 101188095 | A | 5/2008 |
| CN | 101299322 | A | 11/2008 |
| JP | 11-70986 | A | 7/1989 |
| JP | 2001-209355 | A | 8/2001 |

OTHER PUBLICATIONS

International Search Report: mailed Jul. 7, 2011; PCT/CN2011/072466.

* cited by examiner

DRIVING CIRCUIT AND DRIVING METHOD THEREOF AND LIQUID CRYSTAL DISPLAY

TECHNICAL FIELD

The present invention relates to a driving circuit, and a driving method and a liquid crystal display thereof.

BACKGROUND

A liquid crystal display (LCD) is a display of flat panel type commonly used at present, of which a thin film transistor liquid crystal display (TFT-LCD) is a mainstream product. With development of the LCD industry, LCD products with large size have gradually been a mainstream on market. However, an increase in size of the LCD may lead to an increase in resistance and capacitance of data lines and gate lines. Due to a problem of delay by the resistance and the capacitance, a phenomenon of afterimage may be occurred to a picture at time of shut down.

In the related arts, a power supply module with a reset function or an independent chip with a reset function are used to remove the afterimage phenomenon occurred to the picture of the LCD. These devices mainly detect an input voltage of the TFT-LCD. When the input voltage is less than a reference voltage inside the chip, a reset signal is outputted to a gate driving integrated circuit (IC), which pulls all of output voltages of the gate driving IC up to a gate ON voltage, thus the gates of the TFTs of corresponding pixels are turned on, and the function to remove the afterimage is realized.

However, the afterimage phenomenon basically exists in a time period subsequent to the OFF of a backlight source and prior to the OFF of the input signal. According to characteristics of a general product, only when at least 200 ms has been elapsed after the backlight source is turned off, will the input signal and then the input voltage be turned off. Therefore, for a method according to the related arts, the afterimage still may be occurred in 200 ms after the backlight source is turned off. Moreover, in the method according to the related arts, since the reset signal is outputted only when the input signal is detected to be decreased to a certain value, and at the same time, the input voltage is still in a threshold state in which the power supply module and the driving IC are operated and the fall time of the output voltage is from 0 to 10 ms generally (operation states of the power supply module and the gate driving IC are both in a threshold state), the pixel capacitance and the storage capacitance of the TFT-LCD can not be discharged rapidly, which fails to rapidly eliminate the afterimage.

SUMMARY

Embodiments of the present invention provide a driving circuit, and a driving method and a liquid crystal display thereof, so as to realize an effect that the afterimage is eliminated when the backlight source is turned off, thus the display performance is improved.

An embodiment of the present invention provides a driving circuit for a liquid crystal display, comprising: a light sensitive element configured to be arranged on a liquid crystal panel of the liquid crystal display, and detect an operation state of a backlight source of the liquid crystal display; and a reset signal output device configured to receive an input signal from the light sensitive element in accordance with the operation state of the backlight source, and output a reset signal to a gate driver of the liquid crystal display so as to turn on all of gate lines on the liquid crystal panel.

A further embodiment of the present invention provides a driving method for a liquid crystal display, comprising: detecting an operation state of a backlight source of the liquid crystal display; when the backlight source of the liquid crystal display is detected to be turned off, outputting, by a reset signal output device, a reset signal to a gate line driver of the liquid crystal display so as to turn on all of gate lines on the liquid crystal panel.

A still further embodiment of the present invention provides a driving circuit for a liquid crystal display, comprising: a light sensitive diode arranged on a liquid crystal panel for detecting an operation state of a backlight source of the liquid crystal display; a non-inverting amplifier connected to the light sensitive diode; and a P-Metal Oxide Semiconductor transistor (PMOS), of which the gate is connected to an output terminal of the non-inverting amplifier, wherein the PMOS is controlled by the non-inverting amplifier to be turned ON and OFF, so that a reset signal is outputted to a gate driver of the liquid crystal display, so as to turn on all of gate lines.

DETAILED DESCRIPTION

To make objects, technical solutions and advantages provided by embodiments of present invention more clearly, a clear and full description will be made to the technical solutions of the embodiments of the present invention hereinafter in connection with the accompanying drawings of the present embodiments. Apparently, rather than all the embodiments, embodiments to be described is only a part of embodiments of the present invention. Based on the embodiments of the present invention, all the other embodiments acquired by those skilled in the art without making creative work belong to the scope claimed by the present invention.

Figure 1A:
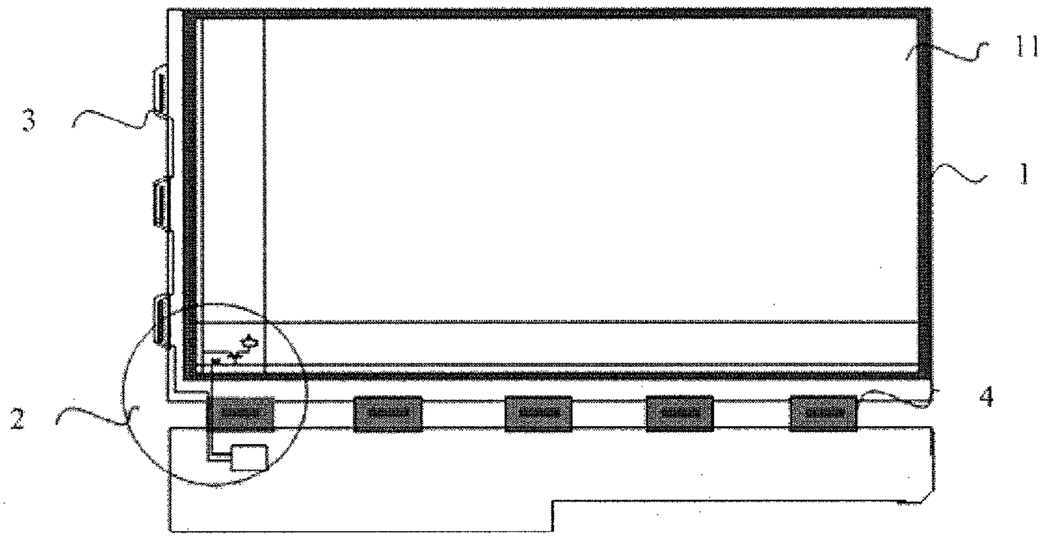
FIG. 1A is a top view of a structure of a liquid crystal display according to an embodiment of the present invention.
Figure 1B:
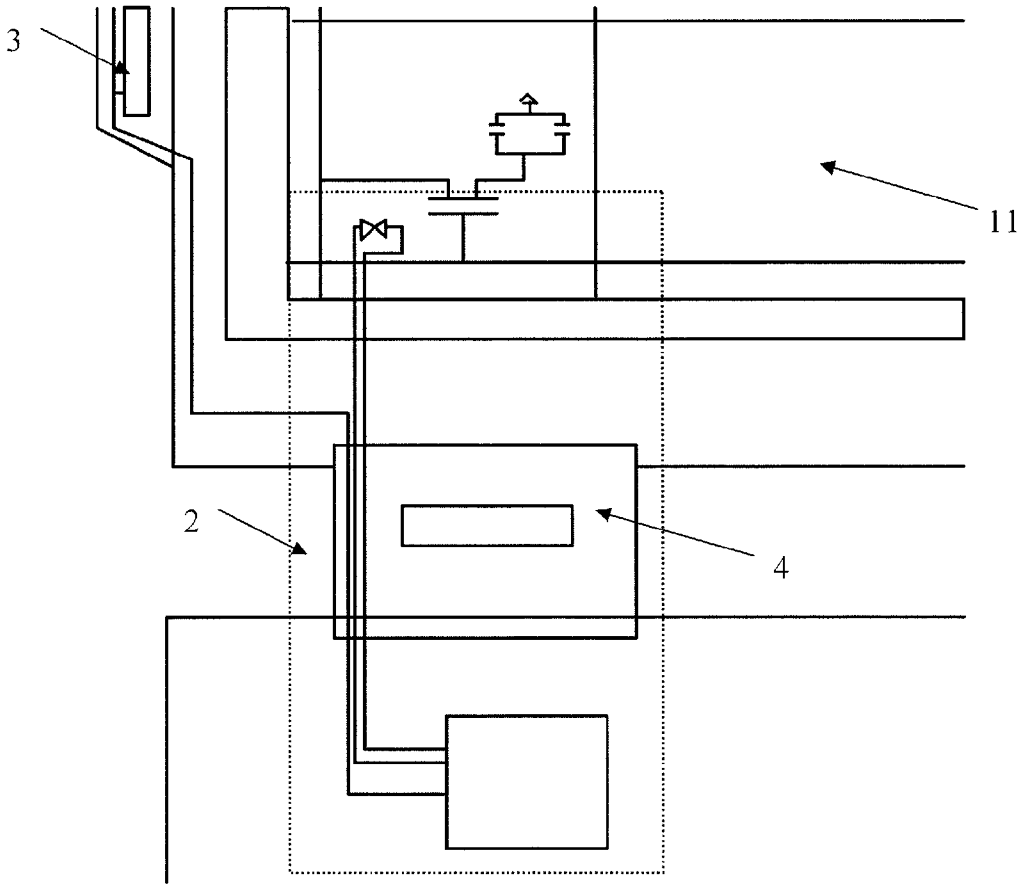
FIG. 1B is diagram showing an enlarged structure of the driving circuit shown in FIG. 1A.

FIG. 1A is a top view of a structure of a liquid crystal display according to an embodiment of the present invention. FIG. 1B is diagram showing an enlarged structure of the driving circuit shown in FIG. 1A.

As shown in FIGS. 1A and 1B, this embodiment provides a liquid crystal display comprising a liquid crystal panel 1, a driving circuit 2, a gate driving integrated circuit IC3 which is a gate line driver, and a source driver IC4 which is a data line driver. The liquid crystal panel 1 includes a pixel area 11 located in the middle area and a peripheral area surrounding the pixel area 11. In the pixel area 11, there is arranged an array constituted by a plurality of rows and columns of pixels. Since the liquid crystal panel is not self light emitted, the liquid crystal display further includes a backlight source (not shown) arranged behind the liquid crystal panel, so as to provide the liquid crystal panel with a light source for display. The backlight source can include a cold cathode fluorescence lamp (CCFL), a light emission diode (LED), and an organic light emission diode (OLED) as a light emission element. The embodiment of the present invention is not limited to the type of the backlight source. The gate driving integrated circuit IC3 is used to apply drive signals to respective rows of gate lines of the pixel array in the pixel area 11, so as to control rows of pixels to be turned ON and OFF. The source driver IC 4 is used to apply data signals to respective columns of data lines of the pixel array in the pixel area 11, so as to control the magnitude of voltage of the pixel electrode on the respective columns of pixels is controlled for a display.

In the embodiment, the driving circuit 2 includes a light sensitive element to detect an operation state of the backlight source, and a reset signal output device. The light sensitive element is a photoelectric conversion sensor based on photoemission of semiconductor, and includes, for example, a light sensitive diode, a light sensitive triode, a light sensitive resistor and the like. The reset signal output device can determine, in accordance with an inputted signal, whether or not to output a reset signal for resetting, for example, the gate line driver, and can include, for example, a digital or an analog circuit such as a switching element, a comparison amplifier or a flip-flop or the like. The switching element can include a three-terminal switching element such as a thin film transistor, a two-terminal switching element such as a diode, and the like.

Figure 2:
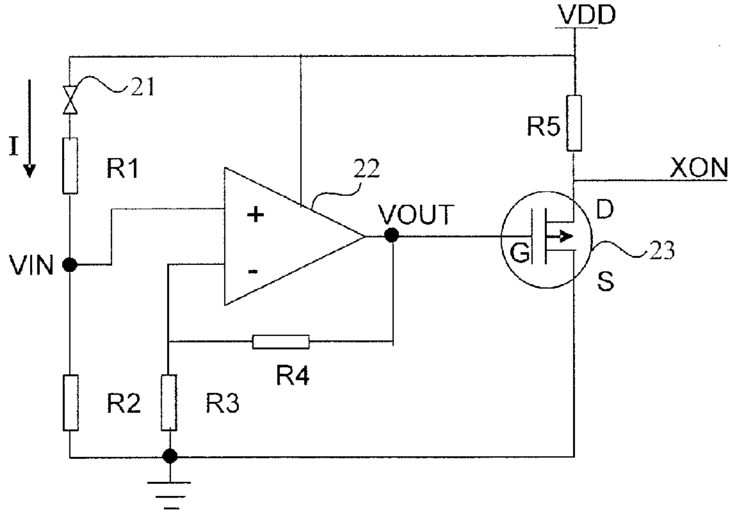
FIG. 2 is diagram showing an equivalent structure of the driving circuit according to the embodiment of the present invention.

One example of the driving circuit 2 includes the light sensitive diode which is the light sensitive element, and a P-Metal Oxide Semiconductor transistor (PMOS) which is the reset signal output device. This example also can include an amplifier to amplify the output from the light sensitive element, such as a non-inverting amplifier. FIG. 2 is diagram showing an equivalent structure of the example of the driving circuit according to the embodiment of the present invention. As shown in FIG. 2, an example of the driving circuit 2 includes a light sensitive diode 21, a non-inverting amplifier 22 and a PMOS 23. The light sensitive diode 21 is associated with the backlight source (not shown), and is arranged in the pixel area 11 of the liquid crystal panel 1 and can be illuminated by the light emitted from the backlight source, so as to detect the operation state of the backlight source. The light sensitive diode 21 also can be arranged in other positions than the pixel area 11, as long as light sensitive diode 21 can detect the light emitted from the backlight source so as to judge the operation state thereof. The non-inverting amplifier 22 is connected to the light sensitive diode 21 to amplify the output signal of the light sensitive diode 21, so as to control the PMOS 23 to be turned ON and OFF. Connected to the output terminal of the non-inverting amplifier 22, the gate of the PMOS 23 is used to output the reset signal to the gate driving integrated circuit IC so as to turn on all of the gate lines. In the embodiment, if the output from the light sensitive diode 21 is sufficient to drive the PMOS 23, which is the reset signal output device, the amplifier 22 is not required.

In a technical solution of the example, with the light sensitive diode 21, the non-inverting amplifier 22 and the PMOS 23 being arranged in the driving circuit 2, the operation state of the backlight source being detected by the light sensitive diode 21, and in accordance with the operation state of the backlight source, the ON and OFF states of the PMOS 23 being controlled by the non-inverting amplifier 22, when the backlight source is turned off, the reset signal is outputted to the gate driving IC by the PMOS 23, so as to turn on all of the gate lines. Thus, the problem of afterimage existing in the pictures displayed on LCD in the related arts is solved, and display performance of the liquid crystal display is improved.

As shown in FIG. 1A, the light sensitive diode 21 in the embodiment can be arranged in the pixel area 11 of the liquid crystal panel 1, such as in the first pixel on left side, but it is not limited thereto. Since a semiconductor process can be adopted to manufacture the light sensitive diode 21, the process of additionally arranging the light sensitive diode 21 in the pixel area 11 is relatively easy to be realized. Based on characteristics of the light sensitive diode itself, when not illustrated by the light, the light sensitive diode is reversely turned off, and the current in the driving circuit can not pass through the light sensitive diode 21; and when illustrated by the light, the light sensitive diode 21 is forwardly turned on, and the current in the driving circuit can pass through the light sensitive diode 21. In the driving circuit according to the embodiment, the light sensitive diode 21 is connected to the backlight source. The light sensitive diode 21 is turned on when the backlight source is switched on, and is turned off when the backlight source is switched off. Therefore, the light sensitive diode 21 can be used to detect the operation state of the backlight source. Change in current or voltage of the light sensitive diode 21 can be reflected by chip Cop (Chip on Film; COF) technology (a way of package of the integrated circuit) and TFT substrate wirings on a flexible substrate. For example, in a case that the current is changed, when a current went through the light sensitive diode 21, indicating that the light sensitive diode 21 is in the ON state, it is detected that the operation state of the backlight source is the ON state. When no current went through the light sensitive diode 21, indicating that the light sensitive diode 21 is in the OFF state, it is detected that the operation state of the backlight source is in the OFF state.

In this example, the non-inverting amplifier 22 can control the PMOS 23 to be in the OFF state when the light sensitive diode 21 is turned on, and to be in the ON state when the light sensitive diode 21 is turned off. For example, by the COF and the TFT substrate wirings, a change in the current of the light sensitive diode 21 can be detected, the detected change in the current of the light sensitive diode 21 is conversed into a change in the voltage, and the ON and OFF of the PMOS 23 is controlled by the non-inverting amplifier 23. As shown in FIG. 2, the resistors of R1 and R2 are voltage division resistors for the forward input terminal of the non-inverting amplifier 22; the resistors of R3 and R4 are feedback resistors; the resistor of R5 is a pull-up resistor for the output of the drain of the PMOS 23; VDD is a power supply of the driving circuit as a whole; VD is the ON voltage of the light sensitive diode 21; VOUT is an input voltage to the gate of the PMOS 23. When the backlight source is turned on, the light sensitive diode 21 is in the ON state, then:

$$VIN=(VDD-VD)*R2/(R1+R2) \quad (1)$$

$$VOUT=VIN(1+R4/R3) \quad (2)$$

At this moment, the source of the PMOS 23 is grounded, that is. Vs is equal to 0, then:

$$V_{GS}=VOUT-V_S=VOUT \quad (3)$$

where $V_{GS}$ is the gate-source voltage of the PMOS 23, Vs is the source voltage of the PMOS 23. In the equivalent circuit of the driving circuit according to the embodiment, to ensure that the PMOS 23 is controlled to be in the OFF state by the non-inverting amplifier 22 when the light sensitive diode 21 is turned on, and to be turned off when the $V_{GS}$ is larger than the threshold voltage $V_{GS(TH)}$ of the PMOS, appropriate resistance values of the resistors of R1, R2, R3 and R4 are selected in the embodiment so that the VOUT is larger than the $V_{GS(TH)}$, thus the PMOS 23 is controlled to be turned off by the non-inverting amplifier 22 when the backlight source is turned on. And when the backlight source is turned off, the light sensitive diode 21 is in the OFF state, and then:

$$VIN=VOUT=0 \quad (4)$$

Then the $V_{GS}$ is smaller than the threshold voltage $V_{GS(TH)}$ of the PMOS, and at this moment, the PMOS 23 is controlled to be turned on by the non-inverting amplifier 22.

In the embodiment, the PMOS 23 is specifically used to output the reset signal to the gate driving IC 3 when the PMOS 23 is in the ON state, so as to turn on all of the gate lines on the liquid crystal panel. According to characteristics of the PMOS, when the PMOS 23 is turned off, (that is, PMOS 23 is in the OFF state), the output of the reset signal XON is the power supply VDD (that is, the reset signal XON outputs a high level), and the gate driving IC 3 is controlled by a normal signal. When the PMOS is turned on (that is, the PMOS is in the ON state), the output of the reset signal XON is a low level. When the PMOS 23 is in the ON state, the low level of the reset signal XON is outputted to the gate driving IC 3, so that all of the gate lines are turned on. Thus, an effect in which the afterimage phenomenon can be eliminated when the backlight source is turned off and the low level lasts till the power supply VDD is turned off can be realized. To ensure the power consumption is relatively low when the PMOS 23 is in the ON state, the resistor of R5 is preferred to be set to be no less than 100 k.

Figure 3:
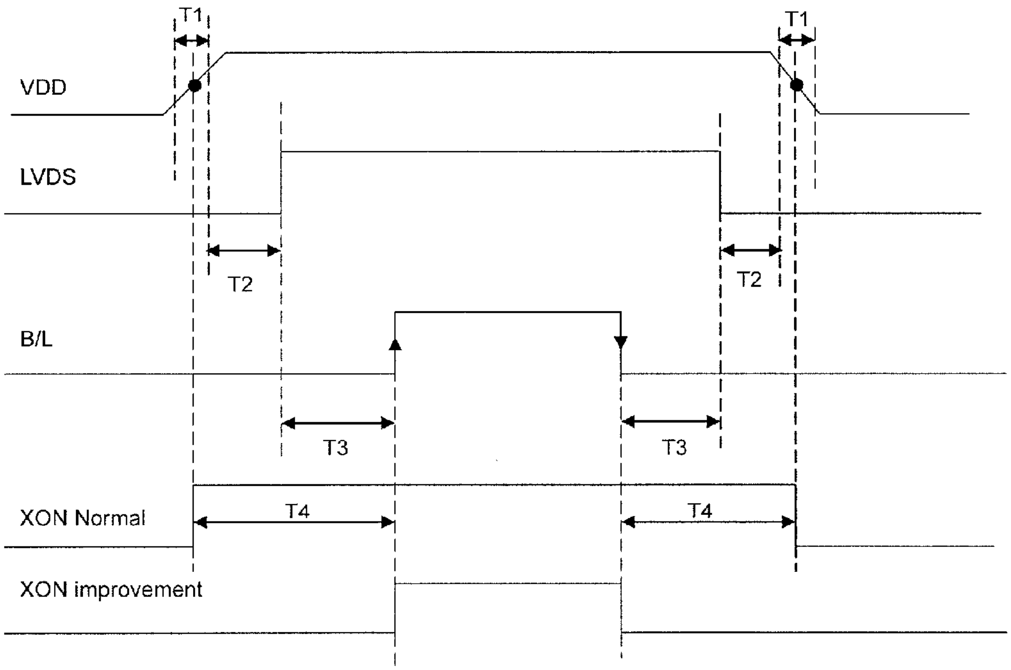
FIG. 3 is a timing chart of signals of the driving circuit according to the embodiment of the present invention.

FIG. 3 is a timing chart of signals of the driving circuit according to the embodiment of the invention. As shown in FIG. 3, VDD shown in the figure is an input voltage of the power supply module and the driving IC, LVDS is a display signal provided by the system to the liquid crystal panel of the TFT-LCD, and B/L is ON signal of the backlight source. Due to a requirement of the power supply module and the driving IC on the power, the rise time of the VDD is from 0 ms to 10 ms. On the driving circuit board, there exists a timing controller mainly for receiving the LVDS signal, and with this chip, it is possible to control the operation states of the gate driving IC 3 and the source driving IC4 so as to realize the display of the TFT-LCD. According to a specification of the timing controller, to ensure to display normally, a time between the LVDS and the VDD is 0~50 ms. When the voltage VDD and the LVDS signal are both provided, the power supply module, the driving IC and the timing controller need a time for initialization. When a stable state in operation is achieved, the backlight source is turned on, and the time thereof generally requires no less than 200 ms, therefore, the above timings are complied with when the TFT-LCD module is turned on. The signal timings at time of turning off are opposite to that of the turning on. XON normal is a timing for outputting the reset signal to the gate driving IC in a traditional mode. As can be seen from FIG. 3. The tradition mode is that the reset signal is outputted when the input voltage VDD is detected to achieve a certain value. And XON improvement is a timing realized by the embodiment of the present invention, for which the reset signal is outputted when the backlight source is detected to be turned off.

In the technical solution of the above example according to the embodiment of the invention, with the light sensitive diode, the non-inverting amplifier and the PMOS being arranged in the driving circuit, the operation state of the backlight source being detected by the light sensitive diode, and in accordance with the operation state of the backlight source, the ON and OFF states of the PMOS being controlled by the non-inverting amplifier, when the backlight source is turned off, the reset signal is outputted to the gate driving IC by the PMOS, so as to turn on all of the gate lines. Thus, the problem of afterimage existing in the pictures displayed on LCD in the related arts is solved, and display performance of the liquid crystal display is improved.

An embodiment of the invention also provides a driving method, which can be implemented by the driving circuit according to the embodiments of the invention to perform corresponding flows. The driving method according to the embodiment of the present invention comprise: providing the liquid crystal panel with one light sensitive element so as to detect an operation state of a backlight source; in accordance with the operation state of the backlight source, outputting, by a reset signal output device, a reset signal to a gate line driver of the liquid crystal display so as to turn on all of gate lines on the liquid crystal panel. The light sensitive element comprises, for example, the light sensitive diode, the light sensitive triode, the light sensitive resistor and the like. The reset signal output device can determine, in accordance with an inputted signal, whether or not to output a reset signal for resetting, for example, the gate line driver, and for example, can be implemented by a digital or an analog circuit such as a comparison amplifier or a flip-flop or the like.

One example of the driving method according to the embodiment can comprise the following steps.

At step 401, the operation state of the backlight source is detected by the light sensitive diode arranged in the pixel array of the liquid crystal panel.

Specifically, when the light sensitive diode is turned on, it is detected that the operation state of the backlight source is the ON state, and when the light sensitive diode is turned off, it is detected that the operation state of the backlight source is the OFF state. When the backlight source is turned on, the light sensitive diode 21 is turned on, and the backlight source is turned off, the light sensitive diode 21 is turned off. Therefore, the light sensitive diode 21 can be used to detect the operation state of the backlight source. For example, a change in the current of the light sensitive diode 21 can be detected by the COF and the TFT substrate wirings. When a current went through the light sensitive diode 21, indicating that the light sensitive diode 21 is in the ON state, it is detected that the operation state of the backlight source is the ON state. When no current went through the light sensitive diode 21, indicating that the light sensitive diode 21 is in the OFF state, it is detected that the operation state of the backlight source is in the OFF state.

At step 402, in accordance with the operation state of the backlight source, the ON and OFF states of the P-Metal Oxide Semiconductor transistor, PMOS, is controlled by the non-inverting amplifier connected to the light sensitive diode, the gate of the PMOS being connected to the output terminal of the non-inverting amplifier.

Specifically, when it is detected that the backlight source is turned on, the PMOS is controlled by the non-inverting amplifier to be in the OFF state; when it is detected that the backlight source is turned off, the PMOS is controlled by the non-inverting amplifier to be in the ON state. With reference to the illustration in FIG. 2, when the backlight source is turned on, the light sensitive diode 21 is in the ON state, and then relations shown in the above formulas (1) and (2) can be derived. At this moment, the source of the PMOS 23 is grounded, that is, Vs is equal to 0, then the relation shown in the above formula (3) can be derived. In the embodiment, appropriate resistance values of the resistors of R1, R2, R3 and R4 are selected, so that the VOUT is larger than the $V_{GS(TH)}$, thus the PMOS 23 is controlled to be turned off by the non-inverting amplifier 22 when the backlight source is turned on. And when the backlight source is turned off, the light sensitive diode 21 is in the OFF state, and then VOUT is 0 and the $V_{GS}$ is smaller than the threshold voltage $V_{GS(TH)}$ of the PMOS. At this moment, the PMOS 23 is controlled to be turned on by the non-inverting amplifier 22.

At step 403, the reset signal is outputted, by the PMOS, to the gate driving integrated circuit IC, so as to turn on all of the gate lines.

Specifically, when the PMOS is in the ON state, the PMOS outputs the reset signal to the gate driving IC, so as to turn on all of the gate lines by the reset signal. According to characteristics of the PMOS, when the PMOS is turned off, (that is, PMOS is in the OFF state), the output of the reset signal XON is the power supply VDD (that is, the reset signal XON outputs a high level). When the PMOS is turned on (that is, the PMOS is in the ON state), the output of the reset signal XON is a low level. When the PMOS 23 is in the ON state, the low level of the reset signal XON is outputted to the gate driving IC so that all of the gate lines are turned on, so as to realize that the afterimage phenomenon can be eliminated when the backlight source is turned off To ensure the power consumption is relatively low when the PMOS is in the ON state, the resistance value of the resistor R5 is preferred to be set to be no less than 100 k.

In the technical solution of the example, with the light sensitive diode, the non-inverting amplifier and the PMOS being arranged in the driving circuit, the operation state of the backlight source being detected by the light sensitive diode, and in accordance with the operation state of the backlight source, the ON and OFF states of the PMOS being controlled by the non-inverting amplifier, when the backlight source is turned off, the reset signal is outputted to the gate driving IC by the PMOS, so as to turn on all of the gate lines. Thus, the problem of afterimage existing in the pictures displayed on LCD in the related arts is solved, and display performance of the liquid crystal display is improved.

Finally, it should be explained that, the above embodiments are only used to explain the technical solution of the present invention, and not for limitation thereto. Although the present invention has been explained in details with reference to the above embodiments, it should be understood by those skilled in the art that, the technical solution described in the above respective embodiments still can be modified, or part of the technical features thereof can be equivalently substituted, and these modifications or substitutions can not depart the essence of a corresponding technical solution from the spirit and scope of the technical solution according to the embodiments of present invention.

What is claimed is:

1. A driving circuit for a liquid crystal display, comprising:

a light sensitive element configured to be arranged on a liquid crystal panel of the liquid crystal display, and detect an ON state and an OFF state of a whole of a backlight source of the liquid crystal display; and a reset signal output device directly connected to the light sensitive element and device configured to receive an input signal from the light sensitive element in accordance with the ON state and the OFF of the backlight source, and output a reset signal to a gate driver of the liquid crystal display so as to turn on all of gate lines on the liquid crystal panel, wherein the reset signal is a high level or a low level, wherein directly based on the input signal from the light sensitive element detecting an ON state and an OFF state of a whole of a backlight source of the liquid crystal display, the reset signal output device output the reset signal, wherein the light sensitive element is configured to being turned off and the reset signal output device is configured to output the low level to the gate driver and all of the gate lines on the liquid crystal panel are turned on while the backlight source is OFF state, and the light sensitive element is configured to being turned on and the reset signal output device is configured to output the high level and the gate driver is controlled by a normal signal and the ON or OFF state of all of the gate lines is not changed while the backlight source is ON state.

2. The driving circuit according to claim 1, wherein the light sensitive element comprises a light sensitive diode, a light sensitive triode or a light sensitive resistor.

3. The driving circuit according to claim 2, wherein the ON state and the OFF state of the backlight source is detected to be the ON state when the light sensitive diode is turned on, and to be the OFF state when the light sensitive diode is turned off.

4. The driving circuit according to claim 1, wherein the light sensitive element is arranged in a pixel area of the liquid crystal panel.

5. The driving circuit according to claim 1, wherein the switching element includes a two-terminal switching element or a three-terminal switching element.

6. The driving circuit according to claim 5, wherein the three-terminal switching element includes a thin film transistor, and the gate of the thin film transistor receives the output signal of the light sensitive element.

7. The driving circuit according to claim 1, further comprising:

an amplifier connected to the light sensitive element for amplifying the input signal outputted by the light sensitive element to the reset signal output device.

8. A driving method for a liquid crystal display, comprising:

detecting an ON state and an OFF state of a whole of a backlight source of the liquid crystal display by a light sensitive element arranged on a liquid crystal panel of the liquid crystal display;

when the backlight source of the liquid crystal display is detected to be turned off, outputting, by a reset signal output device, a reset signal to a gate line driver of the liquid crystal display so as to turn on all of gate lines on the liquid crystal panel, wherein the reset signal is a high level or a low level, wherein directly based on an input signal from the light sensitive element detecting an ON state and an OFF state of a whole of the backlight source of the liquid crystal display, the reset signal output device output the reset signal, the reset signal output device is directly connected to the light sensitive element, wherein the light sensitive element is configured to being turned off and the reset signal output device is configured to output the low level to the gate driver and all of the gate lines on the liquid crystal panel are turned on while the backlight source is OFF state, and the light sensitive element is configured to being turned on and the reset signal output device is configured to output the high level and the gate driver is controlled by a normal signal and the ON or OFF state of all of the gate lines is not changed while the backlight source is ON state.

9. The driving method according to claim 8, wherein the light sensitive element is arranged in a pixel area of the liquid crystal panel, so as to detect the operation state of the backlight source of the liquid crystal display.

10. The driving method according to claim 9, wherein the light sensitive element outputs a control signal to the reset signal output device when the detected backlight source of the liquid crystal display is turned off.

11. The driving method according to claim 10, wherein the control signal outputted from the light sensitive element is amplified, and then is inputted to the reset signal output device.

12. A liquid crystal display comprising a liquid crystal panel, a driving circuit, a gate driver and a source driver, wherein the driving circuit comprises the driving circuit according to claim 1.

13. A driving circuit for a liquid crystal display, comprising:

a light sensitive diode arranged on the liquid crystal display for detecting an ON state and an OFF state of a whole of a backlight source of the liquid crystal display;

a non-inverting amplifier connected to the light sensitive diode; and a P-Metal Oxide Semiconductor transistor (PMOS), of which the gate is connected to an output terminal of the non-inverting amplifier, wherein the PMOS is controlled by the non-inverting amplifier to be turned ON and OFF, so that a reset signal is outputted to a gate driver of the liquid crystal display, so as to turn on all of gate lines, and the reset signal is a high level or a low level, wherein directly based on an input signal from the light sensitive diode detecting an ON state and an OFF state of a whole of a backlight source of the liquid crystal display, the P-Metal Oxide Semiconductor transistor outputs the reset signal, the light sensitive diode is configured to being turned off and the PMOS is configured to output the low level to the gate driver and all the gate lines on the liquid crystal panel are turned on while the backlight source is OFF state, and the light sensitive element is configured to being turned on and the PMOS is configured to output the high level and the gate driver is controlled by a normal signal and the ON or OFF state of all of the gate lines is not changed while the backlight source is ON state.

* * * * *